United States Patent
Terry, Jr. et al.

(10) Patent No.: US 7,226,502 B2
(45) Date of Patent: Jun. 5, 2007

(54) HIGH SOFTENING TEMPERATURE SYNTHETIC ALKYLSILICONE WAX

(75) Inventors: W. Leonard Terry, Jr., Gainesville, FL (US); Gary E. Legrow, Newberry, FL (US)

(73) Assignee: Clariant Finance (BVI) Limited, Tortola (VG)

( * ) Notice: Subject to any disclaimer, the term of this patent is extended or adjusted under 35 U.S.C. 154(b) by 173 days.

(21) Appl. No.: 10/410,947

(22) Filed: Apr. 10, 2003

(65) Prior Publication Data

US 2004/0200384 A1 Oct. 14, 2004

(51) Int. Cl.
*C08G 77/06* (2006.01)

(52) U.S. Cl. ............... 106/287.13; 528/31; 528/37; 528/25

(58) Field of Classification Search .......... 528/15, 528/25, 31
See application file for complete search history.

(56) References Cited

U.S. PATENT DOCUMENTS

| | | | | |
|---|---|---|---|---|
| 3,715,334 | A * | 2/1973 | Karstedt ............. | 528/15 |
| 4,906,721 | A | 3/1990 | Weitemeyer et al. ..... | 528/29 |
| 5,025,054 | A | 6/1991 | Yoshida et al. ......... | 524/267 |
| 5,025,073 | A | 6/1991 | Lewis et al. .......... | 528/15 |
| 5,045,584 | A | 9/1991 | Sasaki et al. .......... | 524/277 |
| 5,074,912 | A | 12/1991 | Liles et al. ........... | 106/2 |
| 5,231,158 | A | 7/1993 | Lewis et al. .......... | 528/15 |
| 5,288,482 | A * | 2/1994 | Krzysik .............. | 424/64 |
| 5,384,357 | A | 1/1995 | Levinson et al. ....... | 524/770 |
| 5,393,521 | A * | 2/1995 | Lance-Gomez et al. . | 424/70.12 |
| 5,578,692 | A | 11/1996 | Biggs et al. | |
| 5,658,852 | A | 8/1997 | Murphy et al. ........ | 504/116 |
| 5,783,719 | A * | 7/1998 | Sun et al. ............ | 556/455 |
| 5,929,186 | A | 7/1999 | Sun et al. | |
| 6,080,902 | A | 6/2000 | Herrmann et al. ...... | 585/512 |
| 6,107,530 | A | 8/2000 | Hohner et al. ......... | 585/9 |
| 6,258,365 | B1 | 7/2001 | LeGrow et al. ........ | 424/400 |
| 6,262,153 | B1 | 7/2001 | Webster et al. ........ | 524/99 |
| 6,323,268 | B1 | 11/2001 | Fisher et al. ......... | 524/266 |
| 6,346,553 | B1 | 2/2002 | LeGrow et al. ........ | 516/55 |
| 6,355,724 | B1 | 3/2002 | LeGrow et al. ........ | 524/731 |
| 6,620,515 | B2 * | 9/2003 | Feng et al. ........... | 428/447 |

FOREIGN PATENT DOCUMENTS

| | | | |
|---|---|---|---|
| EP | 0527286 | | 2/1993 |
| JP | 05043885 | A * | 2/1993 |
| JP | 07041413 | A * | 2/1995 |
| WO | WO 9405731 | A1 * | 3/1994 |
| WO | WO 99/51192 | | 10/1999 |

OTHER PUBLICATIONS

English abstract for JP 06-025381, Feb. 1, 1994.
Dow Corning Corporation Material Safety Data Sheet for Dow Corning AMS-C30 cosmetic wax, Feb. 14, 2002.

* cited by examiner

*Primary Examiner*—Marc S. Zimmer
(74) *Attorney, Agent, or Firm*—Anthony A. Bisulca

(57) ABSTRACT

A method for making high softening point linear and cyclic alkylsilicone waxes includes reacting a C30+ alpha olefin wax with a silicone hydride polymer in the presence of a catalyst. The high softening point linear and cyclic alkylsilicone waxes have softening points approximating those of natural waxes and, in consequence, can be used in applications which traditionally employ natural waxes.

32 Claims, No Drawings

HIGH SOFTENING TEMPERATURE SYNTHETIC ALKYLSILICONE WAX

BACKGROUND OF THE INVENTION

The invention relates generally to waxes, and, in particular, to synthetic waxes.

Natural waxes, such as for example Candelilla and Carnauba wax, have long been employed in cosmetic products such as lipstick and polish formulations for leather goods, furniture, and automotive applications. Other applications for natural waxes include, for example, electric insulating compositions, carbon paper and paint removers, inks, wood finishes and a variety of industrial coatings.

With respect to polishing formulations, the main attribute of natural waxes which has accounted for their use, to the exclusion of synthetic waxes, is their high softening point or temperature. As used herein, the phrase "softening point" or "softening temperature" is understood to mean the temperature at which a given wax first begins to soften or melt on a surface. In polishing formulations, and in particular automotive polishes, the ability to withstand high temperature is critical to consumer acceptance. Failure to do so leaves the polished surface susceptible to visual imperfections such as fingerprints and various marks left by objects, such as leaves and dirt, impacting the polished surface.

Despite their high softening temperatures, there are disadvantages to the use of natural waxes in the previously mentioned applications. The production of natural waxes depends on the success of the crop for a particular season, and in consequence, natural waxes are susceptible to wide price fluctuations.

Natural waxes also suffer from the inability to maintain consistency in their chemical composition and/or their physical or rheological properties. This lack of consistency is attributable to the fact that natural waxes are harvested from a variety of farms. Even with a natural wax harvested from the same farm, year to year variations can contribute to a difference in softening temperature being as large as 5° F. These fluctuations often lead to a lack of uniform performance characteristics in the products which utilize the natural waxes.

In order to overcome this problem, natural wax producers will purchase the wax from a number of different farmers and blend the waxes from the disparate sources in order to achieve uniform physical and chemical characteristics, the two most important characteristics being the softening point and the melt viscosity. This blending procedure is in large part dictated by trial and error and is labor intensive, resulting in increased costs, which are subsequently passed onto the natural wax purchasers.

Heretofore, attempts have been made to produce a synthetic wax having a softening temperature approximating the softening temperature of natural waxes. These attempts have been largely unsuccessful. The currently available synthetic waxes that do approximate the softening point of natural waxes do not exhibit other physical and chemical characteristics required by the end use applications, such as, for example, its ability to be formulated, or to buffed to produce a high gloss.

Therefore, there exists a need for a synthetic wax having a softening point which approximates, or exceeds, those of natural waxes, is consistent in its physical and chemical properties and exhibits those characteristics mandated by the end use applications, such as, for example, automotive polishes or cosmetic products.

SUMMARY OF THE INVENTION

This invention is directed to method for making linear and cyclic alkylsilicone waxes having high softening points which approximate or exceed natural wax which includes hydrosilating a C30+ alpha olefin wax with a siloxane hydride in the presence of a catalyst. The synthetic high softening point alkylsilicone waxes produced according to this invention achieve softening temperatures approximating or exceeding the softening temperature of natural waxes and can, in consequence, be used in applications which heretofore required natural waxes. The substitution of the synthetic alkylsilicone waxes for natural waxes increases uniformity in the physical and chemical characteristics of the final product and also reduces costs.

Accordingly, in another aspect, the present invention is directed to compounds which utilize high softening point waxes, wherein the wax is of the Formula (I) or (II):

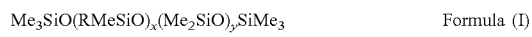

Formula (I)

wherein R is

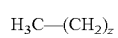

$z = 28$ to $100$,
$x = 1$ to $1000$,
$y = 0$ to $1000$, or

Formula (II)

Formula (II)

wherein R is $H_3C-(CH_2)_z$ $z = 28$ to $100$
$a = 1$ to $20$,
$b = 0$ to $20$, and
$a+b$ ranges from $3$ to $6$.

Such compounds include, for example, polish formulations for leather goods, furniture, and automotive applications, electric insulating compounds, carbon paper and paint removers.

These and other objects, advantages and features of this invention will become apparent upon review of the following specification.

DETAILED DESCRIPTION OF THE PREFERRED EMBODIMENTS

The present invention provides for a method of making linear and cyclic, high softening point alkylsilcone waxes which approximate the softening temperature of natural waxes. The linear alkylsilicone waxes are represented by Formula (I)

Formula (I)

wherein R is

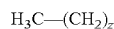

$z = 28$ to $100$,
$x = 1$ to $1000$, y=0 to 1000, and

Me is $CH_3$

Preferably, z is between 30 and 50. Most preferably, z is an average of 34.7. Also, preferably, x is between 1 and 100, while y is less than 200. The waxes represented by Formula (I) exhibit a softening temperature between approximately 60° C. and 85° C.

The cyclic alkylsilicone waxes according to the present invention are represented by Formula (II):

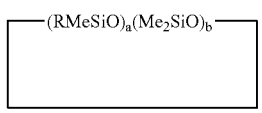

Formula (II)

wherein R is

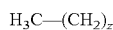

z=28 to 100 a=1 to 20, b=0 to 20, and a+b ranges from 3 to 6,

Me is $CH_3$

Preferably a is between 1 and 6, b is between 0 and 5, and the total of a+b ranges from 3 to 6. The waxes represented by Formula (II) exhibit a softening temperature between approximately 60° C. and 75° C.

The method for the formulation of the high softening point alkylsilicone waxes of Formulas (I) and (II) includes reacting, via hydrosilylation, a C30+ alpha olefin wax with a silicone hydride polymer in the presence of a catalyst. The C30+ alpha olefin wax may be chosen from any wax which has a high % linear structure (>95%) and a high % terminal olefin functionality (>95%). Preferably, the C30+ alpha olefin wax is represented by Formula (III)

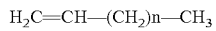

Formula (III)

wherein n is between 30 and 100. Preferably, n is between 30 and 50. Most preferably, n has an average value of 32.7. The most preferred wax C30+ alpha olefin wax for use with this invention is entitled Alpha Olefin 30+ HA sold by Chevron Corporation.

The silicone hydride polymer is preferably a fluid and may be any one which possesses Si—H functionality and has a minimum residual Si—OH functionality of 0.1 mmole/g. Non-limiting examples of silicone hydride polymers capable for use with this invention include those which are linear with Si—H functionality on the ends of the chains, along the chains or both, and those which are cyclic. Preferably, the silicone hydride polymer employed for the synthesis of linear alkylsilicone waxes, as represented by Formula (I), is represented by Formula (IV):

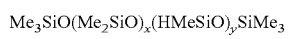

Formula (IV).

In a preferred embodiment, x is between 1 and 100, while y is less than 200.

Preferably, the silicone hydride polymer employed for the synthesis of cyclic alkylsilicone waxes, as represented by Formula (II), is represented by Formula (V):

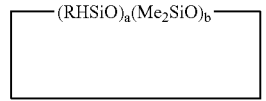

Formula (V)

a=1 to 20, b=1 to 20, and a+b ranges from 3 to 6, and

Me is $CH_3$

Preferably a is between 1 and 6, b is between 0 and 6, and the total of a+b ranges from 3 to 6.

Any catalyst which promotes the hydrosilylation of terminal olefins at a much greater rate than internal isomerization of said olefin can be used in conjunction with the present method. Exemplary catalysts include platinum, palladium, and rhodium and inorganic salts or organic complexes thereof. Preferably, the catalyst is a neutral complex of $PtCl_2$ and a low molecular weight vinyl substituted silicone. Non-limiting examples of catalysts include Ashby's® and Karstedt's® Catalyst. Ashby's® catalyst has the formula:

wherein Vi is a vinyl resin and Me is $CH_3$

Karstedt's® Catalyst has the formula:

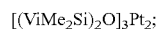

wherein Vi is a vinyl resin and Me is $CH_8$.

The hydrosilylation reaction is carried out at a temperature of between 80° C. and 150° C., preferably between 80° C., and 120° C., and most preferably between 80° C. and 100° C.

The C30+ alpha olefin wax is present in an amount between a 1.00 and 1.20 molar ratio of alpha olefin to Si—H functionality, preferably 1.05 and 1.10 molar ratio of alpha olefin to Si—H functionality.

In a preferred embodiment, the C30+ alpha olefin wax is heated first to a molten state, which occurs at approximately 80° to 90° C. Thereafter, the catalyst is stirred into the molten C30+ alpha olefin wax. Once the catalyst has been stirred within the C30+ alpha olefin wax, the silicone hydride polymer is introduced into the mixture and the temperature is monitored so as not to exceed approximately 100° C. The mixture is then heated for a period approximating 4 hours at a temperature of approximately 100° C. The alkylsilicone wax is then removed from the vessel and cooled in accordance with normal industry procedure.

The linear and cyclic high softening point alkylsilicone waxes of the present invention can be used as a substitute for natural wax in virtually every application utilizing natural waxes. Such applications include, for example, polish formulations for leather goods, furniture, and automotive applications, electric insulating compounds, carbon paper, paint removers, inks, wood finishes and a variety of industrial polishes. The high softening point alkylsilicone waxes of the present invention are particularly suitable for use in automobile polish formulations as they can be easily formulated and can be buffed.

EXAMPLES

The following examples are presented for the purpose of illustrating the present invention. They are not, however, to be construed to limit the scope of the invention in any manner whatsoever.

In the following table, various compounds represented by Formulas (III) and (IV) were used to make the various wax compositions. The experimental procedure for all Experimental waxes 1 through 5 were as follows:

The C30+ alpha olefin wax was added to a flask and heated until it was molten, typically about 80–90C. The platinum catalyst (about 10 ppm of either Karsted's or Ashby's) was then added to the molten wax with stirring. Next, the silicone hydride functional fluid was added dropwise from an additional funnel to the molten wax, monitoring the temperature of the reacting mixture. As necessary, the heating mantle was removed (because of the exotherm) to maintain the temperature during the reaction at not more than 100° C. After complete addition of the silicone hydride functional fluid, the mixture was heated at 100° C. for an additional 4 hour period. A sample of the mixture was then removed and an IR analysis was performed to show that all silicone hydride had been consumed. At this point, in experiments 4 and 5, a vacuum was applied to remove any traces of unreacted Si—H reagent. After that step was complete, all five molten products were poured into open top jars and cooled to room temperature. Samples of the solid waxes were then measured for softening point as reported in the attached table.

| Products Softening Point (° C.) |
| --- |
| 1 |
| $Me_3SiO(CH_3(CH_2)_{34.7}MeSiO)_{10}SiMe_3$ |
| 83° |
| 2 |
| $Me_3SiO(Me_2SiO)_3(CH_3(CH_2)_{34.7}MeSiO)_5SiMe_3$ |
| 72° |
| 3 |
| $(CH_3(CH_2)_{34.7}MeSiO)_4$ |
| 73° |
| 4 |
| $(Me_3SiO)_2MeSi(CH_2)_{34.7}CH3$ |
| 63° |
| 5 |
| $(Me_2SiO)_3(CH_3(CH_2)_{34.7}MeSiO)$ |
| 64° |

As can be seen by the attached table, three of the high softening point alkylsilicone waxes of the present invention possess softening temperatures approximating or exceeding the softening temperatures of Candelilla Wax (softening temperature=approximately 68° C. minimum) while one alkylsilicone wax of the present invention possesses or exceeds a softening temperature approximating that of Carnauba wax (softening temperature=approximately 80° C. minimum)

The invention claimed is:

1. A method for making a high softening point linear alkylsilicone wax having the Formula (I)

$$Me_3SiO(RMeSiO)_x(Me_2SiO)_ySiMe_3 \quad \text{Formula (I)}$$

wherein R is $$H_3C-(CH_2)_z$$

z=an average of 34.7 and the olefin wax has a $C_{30+}$ fraction of at least 92 wt. %,
x=1 to 1000,
y=0 to 1000, and
Me is $CH_3$
comprising the step of hydrosilylating an olefin wax having the Formula (III)

$$H_2C=CH-(CH_2)n-CH_3 \quad \text{Formula (III)}$$

wherein n is an average of 32.7 with a siloxane hydride polymer in the presence of a catalyst.

2. The method of claim 1, wherein the siloxane hydride polymer is of the Formula (IV)

$$Me_3SiO(HMeSiO)_x(Me_2SiO)_ySiMe_3 \quad \text{Formula (IV)}$$

wherein x and y are as defined in claim 1.

3. The method of claim 2, wherein x is between 1 and 100.

4. The method of claim 2, wherein y is less than 200.

5. The method of claim 1, wherein the catalyst is selected from the group consisting of $[(ViMeSiO)_4]_3Pt$ $[(ViMeSiO)_4]_xPt$ and $[(ViMe_2Si)_2O]3Pt2$, wherein Vi is a vinyl moiety and Me is $CH_3$.

6. The method of claim 1, wherein the catalyst is selected from the group consisting of platinum, palladium, rhodium, and an inorganic, organic or organosilicone complex thereof.

7. A method for making a high softening point linear alkylsilicone wax having the formula (I)

$$Me_3SiO(RMeSiO)_x(Me_2SiO)_ySiMe_3 \quad \text{Formula (I)}$$

wherein R is $$H_3C-(CH_2)_z$$

z=an average of 34.7,
x=1 to 1000,
y=0 to 1000, and
Me is $CH_3$
comprising the step of hydrosilylating an olefin wax having the formula (III)

$$H_2C=CH-(CH_2)n-CH_3 \quad \text{Formula (III)}$$

wherein n is an average of 32.7
with a siloxane hydride polymer in the presence of a catalyst.

8. A formulation comprising a high softening point linear alkylsilicone wax of Formula (I) made in accordance with the method of claim 1.

9. The formulation of claim 8, wherein the formulation is selected from the group consisting of polishing formulations, personal care formulations, cosmetic formulations, electric insulating formulations and paint remover formulations.

10. A method for making a high softening point cyclic alkylsilicone wax having the Formula (II)

$$\boxed{(RMeSiO)_a(Me_2SiO)_b} \quad \text{Formula (II)}$$

wherein R is $$H_3C-(CH_2)_z$$

z=an average of 34.7 and the olefin wax has a $C_{30+}$ fraction of at least 92 wt. %
a=1 to 20,
b=0 to 20, a+b ranges from 3 to 6, and
Me is CH$_3$
comprising the step of hydrosilylating an olefin wax having the Formula (III)

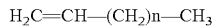  Formula (III)

wherein n is an average of 32.7 with a siloxane hydride polymer in the presence of a catalyst.

11. The method of claim 10, wherein the siloxane hydride polymer is of the Formula (V)

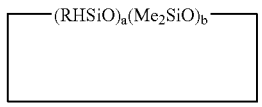  Formula (V)

wherein a, b and a+b, R and Me are as defined in claim 10.

12. The method of claim 11, wherein a is between 1 and 6.

13. The method of claim 11, wherein b is between 0 and 6.

14. The method of claim 10, wherein the catalyst is selected from the group consisting of [(ViMeSiO)$_4$]$_x$Pt and [(ViMe$_2$Si)$_2$O]$_3$Pt$_2$, wherein Vi is a vinyl moiety and Me is CH$_3$.

15. The method of claim 10, wherein the catalyst is platinum.

16. A formulation comprising a high softening point cyclic alkylsilicone wax of Formula (IV) made in accordance with the method of claim 10.

17. The formulation of claim 16, wherein the formulations is selected from the group consisting of polishing formulations, personal care formulations, electric insulating formulations and paint remover formulations.

18. An automotive polish comprising a high softening point linear alkylsilicone wax having the Formula (I):

Me$_3$SiO(RMeSiO)$_x$(Me$_2$SiO)$_y$SiMe$_3$  Formula (I)

wherein R is

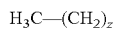

z=an average of 34.7 and the olefin wax has a C$_{30+}$ fraction of at least 92 wt. %,
x=1 to 1000,
y=0 to 1000, and
Me is CH$_3$.

19. The automotive polish of claim 18, wherein x is between 1 and 100.

20. The automotive polish of claim 18, wherein y is less than 200.

21. An automotive polish comprising a high softening point cyclic alkylsilicone wax having the Formula (II)

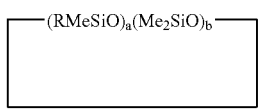  Formula (II)

wherein R is

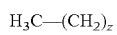

z=an average of 34.7 and the olefin wax has a C$_{30+}$ fraction of at least 92 wt. %,
a=1 to 20,
b=1 to 20,
a+b is less than or equal to 6, and
Me is CH$_3$.

22. The automotive polish as recited in claim 21, wherein a=1 to 6.

23. The automotive polish as recited in claim 21, wherein b=0 to 6.

24. Carbon paper comprising a high softening point linear alkylsilicone wax of Formula (I) made in accordance with the method of claim 1.

25. Carbon paper comprising a high softening point linear alkylsilicone wax of Formula (I) made in accordance with the method of claim 1.

26. A method for making a high softening point cyclic alkylsilicone wax having the Formula (II)

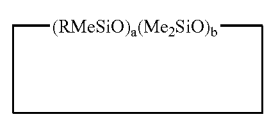  Formula (II)

wherein R is

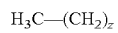

z=an average of 34.7,
a=1 to 20,
b=0 to 20,
a+b ranges from 3 to 6, and
Me is CH$_3$
comprising the step of hydrosilylating an olefin wax having the Formula (III)

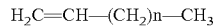  Formula (III)

wherein n is an average of 32.7, with a siloxane hydride polymer in the presence of a catalyst.

27. Carbon paper comprising a high softening point cyclic alkylsilicone wax of Formula (IV) made in accordance with the method of claim 10.

28. A method for making a high softening point linear alkylsilicone wax having the Formula (I)

Me$_3$SiO(RMeSiO)$_x$(Me$_2$SiO)$_y$SiMe$_3$  Formula (I)

wherein R is

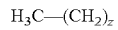

z=an average of 34.7,
x=1 to 1000,
y=0 to 1000, and
Me is CH$_3$
comprising the step of hydrosilylating an olefin wax, wherein the olefin wax has a minimum wt. % of C$_{30+}$ of greater than or equal to 92.0, a maximum wt. % of C$_{24}$ of less than 0.1, a maximum wt. % of C$_{24-28}$ less than or equal to 8.0, an average wt. % of linear alpha olefin of 83.0, an average wt. % of linear internal olefins of 3.0 and an average wt. % of branched olefins of 14,
with siloxane hydride polymer in the presence of a catalyst.

29. A formulation comprising a high softening point linear alkylsilicone wax of Formula (I) made in accordance with the method of claim 28.

30. The formulation of claim 29, wherein the formulation is selected from the group consisting of polishing formulations, personal care formulations, cosmetic formulations, electric insulating formulations and paint remover formulations.

31. Carbon paper comprising a high softening point linear alkylsilicone wax of Formula (I) made in accordance with the method of claim 28.

32. An automotive polish comprising a high softening point linear alkylsilicone wax of Formula (I) made in accordance with the method of claim 28.

* * * * *